United States Patent [19]

Hellon et al.

[11] Patent Number: 5,145,273
[45] Date of Patent: Sep. 8, 1992

[54] LOCKING MEMBER AND STABILIZER BAR/LOCKING MEMBER COMBINATION

[75] Inventors: Keith Hellon, Libertyville, Ill.; Gerald D. Nickerson, Gilbralter, Mich.

[73] Assignee: Mac Lean Fogg Company, Mundelein, Ill.

[21] Appl. No.: 660,132

[22] Filed: Feb. 22, 1991

[51] Int. Cl.$^5$ .................................. F16D 1/00
[52] U.S. Cl. ..................... 403/24; 403/368; 403/344; 403/195
[58] Field of Search ............ 403/368, 371, 344, 71, 403/195, 24; 174/153 G, 152 G, 65 G

[56] References Cited

U.S. PATENT DOCUMENTS

| | | |
|---|---|---|
| 1,806,176 | 5/1931 | Owens . |
| 2,347,044 | 4/1944 | Frances . |
| 2,592,130 | 4/1952 | Erb et al. ............ 174/153 G |
| 2,706,114 | 4/1955 | Castello . |
| 2,738,185 | 3/1956 | Cosken . |
| 3,056,852 | 10/1962 | Sachs . |
| 3,366,356 | 1/1968 | Fisher . |
| 4,030,741 | 6/1977 | Fidrych ................ 285/161 |
| 4,033,535 | 7/1977 | Moran . |
| 4,108,507 | 8/1978 | Renner et al. ........ 174/153 G X |

FOREIGN PATENT DOCUMENTS 171164 10/1982 Japan .................. 174/153 G

OTHER PUBLICATIONS

Advertisement of Bikon Corporation, Thomas Register 1989.
Advertisement of Ringfeder, Ringfeder Corporation, Westwood, NJ.

Primary Examiner—Andrew V. Kundrat
Attorney, Agent, or Firm—Willian Brinks Olfer Gilson & Lione

[57] ABSTRACT

A locking member, preferably used for preventing axial displacement of a stabilizer bar on an automobile, includes inner and outer elements interconnected by a strap. The inner element includes two portions joined to each other by a living hinge. Contacting surfaces of the inner and outer elements are tapered to generate a clamping force when the outer element is assembled over the inner element.

27 Claims, 3 Drawing Sheets

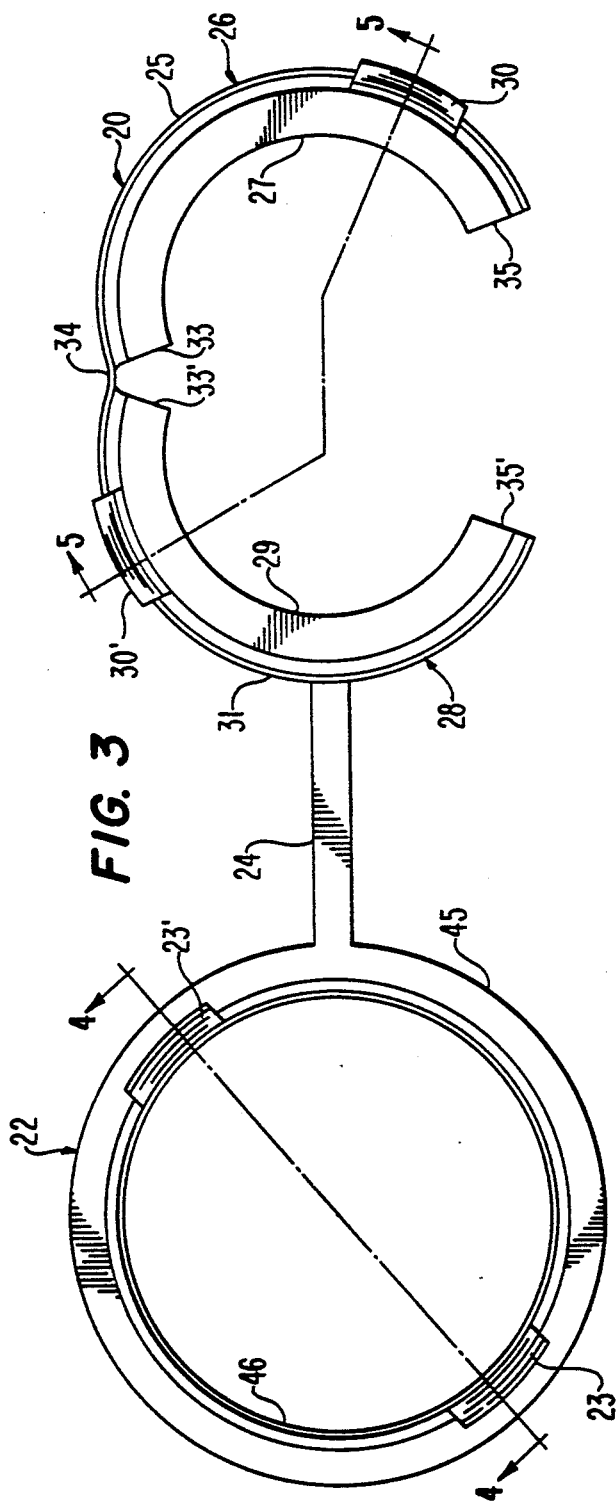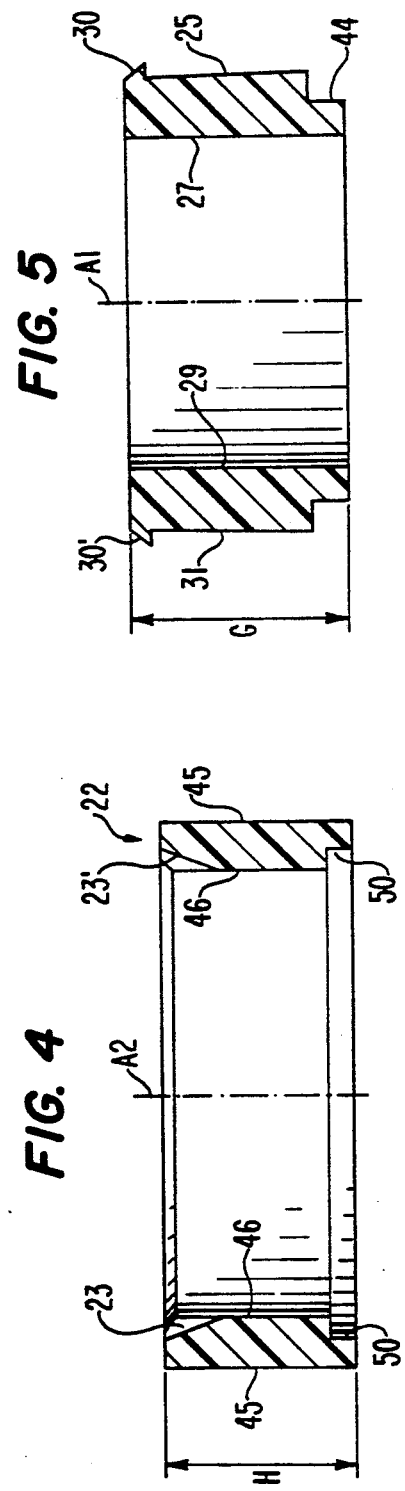

LOCKING MEMBER AND STABILIZER BAR/LOCKING MEMBER COMBINATION

BACKGROUND OF THE INVENTION

1. Field of the Invention

This invention is directed to a two element locking member, particularly for use in maintaining a stabilizer bar of an automotive suspension system in a relatively stationary position. The invention is additionally directed to an automotive stabilizer bar having a two element locking member of this invention assembled on the stabilizer bar.

2. Description of Related Art

Stabilizer bars are torsion springs which conduct movement of an automotive suspension from one side of an automobile to the other, and they are commonly used to reduce the tendency of a chassis to roll during cornering. A stabilizer bar is usually mounted to the chassis of an automobile by means of resilient bushings. For proper operation, the stabilizer bar should be free to rotate in the bushings, yet restricted from movement through the bushings along the length of the stabilizer bar.

One common approach to controlling the movement of a stabilizer bar along its length includes forming an annular upset ridge on the stabilizer bar in a hot forming operation. This ridge is positioned to contact an edge of an adjacent bushing to hold the stabilizer bar in place. Because the annular ridge is formed by a hot pressing operation, a large capital expenditure is required for the necessary tooling, and the maximum size of the ridge is limited. In extreme cases, the ridge may actually move into the rubber bushing, holding the stabilizer bar out of the centered position.

Another approach involves placing a length of a rubber hose and a hose clamp on the stabilizer bar to form a stop which limits axial movement of the stabilizer bar.

It is an object of this invention to provide an improved means for maintaining a stabilizer bar in a selected position, which avoids the need to create an upset ridge on the stabilizer bar, and which can be quickly installed.

SUMMARY OF THE INVENTION

According to a first aspect of this invention, a two element locking member comprises an inner element, an outer element, and a strap interconnecting the inner and outer elements. The inner element comprises at least first and second portions which are joined to each other by at least one hinge at one end of the each of the two portions. Each of the portions comprises a first tapered surface, tapered along a longitudinal axis of the inner element, and the outer element comprises a second tapered surface, tapered along an axis of the outer element. The tapered surfaces are oriented to allow insertion of the inner element into the outer element, and they generate clamping forces tending to hold the locking member in place once the two elements are assembled.

According to a second aspect of this invention, a locking member comprises inner and outer elements as described above. At least one locking ridge is positioned on one of the inner and outer elements, and at least one ramp is formed on the other of the inner and outer elements to receive the locking ridge. The length of the ramp is less than the length of the first tapered surface along the first axis, and the first and second tapered surfaces are oriented to allow insertion of the inner element into the outer element.

The two element locking member is installed on a stabilizer bar by placing the first and second portions around the stabilizer bar and sliding the outer element over the inner element such that the tapered surfaces clamp the inner element in place on the bar. Once assembled, the locking member is substantially fixed in position on the bar and acts as a stop that cooperates with the bushing to hold the bar in a centered position.

This invention is also directed to an automotive stabilizer bar having a two element locking member applied thereto. This locking member comprises an inner element and an outer element, wherein the inner element comprises at least two portions. Each of the portions comprises an interior surface in contact with the stabilizer bar and an external surface, and one of the surfaces of each of the portions defines a first tapered surface which is tapered along an axis of the inner element. The outer element comprises an interior surface in contact with the inner element and an external surface, and the interior surface of the outer element defines a second tapered surface which is tapered along an axis of the outer element. The first and second tapered surfaces cooperate to generate an inwardly directed clamping force which clamps the inner element in position on the stabilizer bar.

The two element locking member of this invention has a number of advantages. It is relatively inexpensive to produce, and it eliminates the high tooling cost needed to form the upset ridge of the prior art. The strap and hinge cooperate to maintain the entire locking member as a unitary assembly prior to insertion of the inner element into the outer element, thereby simplifying assembly, inventorying and purchasing.

BRIEF DESCRIPTION OF THE DRAWINGS

FIG. 3 is a top view of the locking member of FIG. 1.

FIG. 4 is a cross-sectional view taken along line 4—4 of FIG. 3.

FIG. 5 is a cross-sectional view taken along line 5—5 of FIG. 3.

DETAILED DESCRIPTION OF THE PRESENTLY PREFERRED EMBODIMENTS

Figure 1:
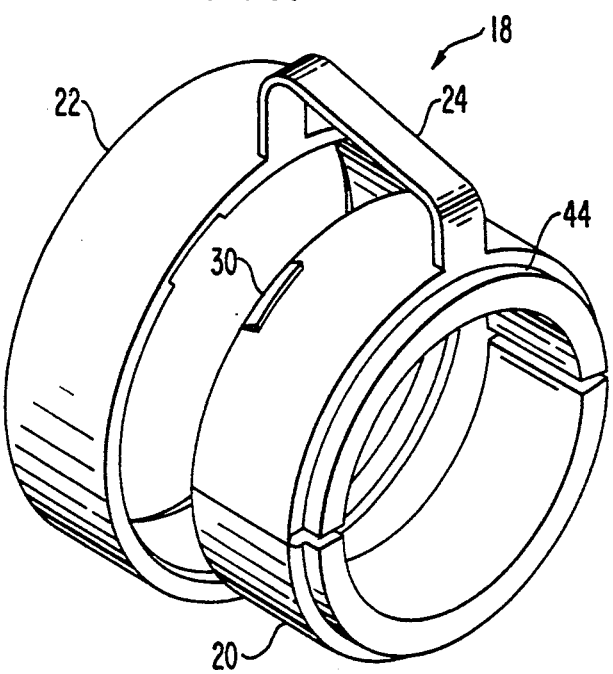
FIG. 1 is a perspective view of a preferred embodiment of the two element locking member of this invention.

Turning now to the drawings, FIG. 1 shows a two element locking member 18 comprising an inner element 20 and an outer element 22. The inner element 20 is attached to the outer element 22 by a flexible strap 24, and the elements 20, 22 and the strap 24 are preferably molded as an integral unit. The inner and outer elements 20, 22 are shown in detail in FIGS. 3, 4, and 5.

As illustrated in FIG. 3, the inner element 20 includes first and second portions 26, 28 which are joined to each other at ends 33, 33' by a living hinge 34. Each of the two portions 26, 28 defines an interior surface 27, 29 and an external surface 25, 31. Each of the two portions 26, 28 also defines a locking ridge 30, 30' which locks the inner element 20 within the outer element 22 as described below. When the first portion is brought into contact with the second portion, the two portions 26, 28 define a substantially annular shape.

The opposed ends 35, 35' of each of the two portions are shaped in such a manner that a gap is formed therebetween when the inner element 20 is placed around a stabilizer bar as described below. This gap allows the inner element 20 to accommodate stabilizer bars having a range of diameters.

Figure 2:
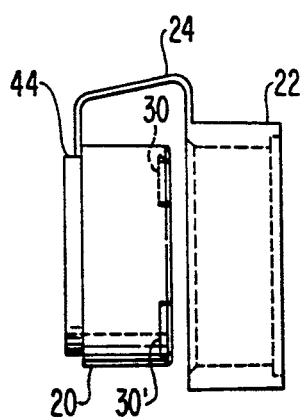
FIG. 2 is a side view of the locking member of FIG. 1.

The interior surfaces 27, 29 are circularly cylindrical and the external surfaces 25, 31 define first tapered surfaces (FIGS. 1, 2 and 5). The first tapered surfaces extend substantially along the entire width of the external surfaces 25, 31. In this preferred embodiment, each of the first tapered surfaces is a portion of a frusto-conical surface oriented at an angle of about 1° to 5° (preferably about 2°) with respect to the longitudinal axis A1.

Turning now to FIG. 4, the outer element 22 comprises a unitary ring having an external surface 45 and an interior surface 46. The interior surface 46 of the outer element 22 defines recessed ramps 23, 23' oriented to receive the ridges 30, 30', respectively (FIG. 3). The ramps 23, 23' are shaped to facilitate insertion of the ridges 30, 30' into the outer element 22. The interior surface 46 also defines a second tapered surface extending substantially along the entire width of the interior surface 46 along the longitudinal axis A2. In this preferred embodiment, the second tapered surface also is a frusto-conical surface which defines an angle of about 1° to 5° (preferably about 2°) with respect to the axis A2. The ramps 23, 23' are shorter than the second tapered surface along the axis A2 to maximize the area of the second tapered surface. The outer element 22 also defines a flange 50 (FIG. 4) for receiving the ridges 30, 30'.

Figure 6:
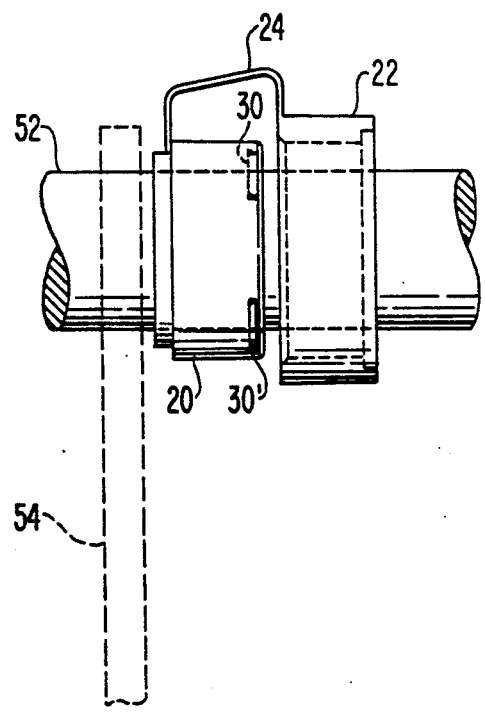
FIG. 6 is an illustration of the locking member of FIG. 1 positioned on a stabilizer bar, prior to assembly.
Figure 7:
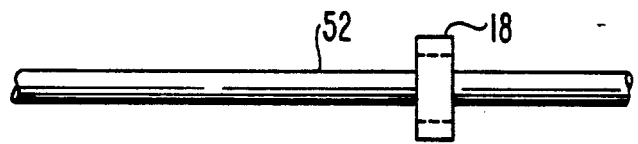
FIG. 7 is an illustration of the stabilizer bar of FIG. 7 with the locking member fully assembled.

FIG. 6 shows the locking member 18 placed about a stabilizer bar 52 which is supported by a frame 54. Both the stabilizer bar 52 and the frame 54 are conventional in the art. FIG. 6 shows the locking member 18 prior to assembly and FIG. 7 shows the stabilizer bar 52 with the locking member 18 fully assembled. The first and second tapered surfaces defined by the external surfaces 25, 31 and the interior surface 46 provide a clamping force that secures the inner element 20 on the stabilizer bar 52. The ridges 30, 30' lock the inner element 20 in the assembled position in the outer element 22, and the assembled locking member acts as a stop to locate the stabilizer bar 52.

The following details of construction are provided merely as an example, and are not to be construed as limiting. In this embodiment, the width of the ridges 30, 30' is preferably 9.5mm, the internal taper of the ramps 23, 23' is 20°, the depth of the ridge 50 is 2mm, the height H (FIG. 4) of the outer element 22 is 16mm and the height G (FIG. 5) of the inner element 20 is 18.2mm. The beveled surface of each locking ridge 30, 30' is preferably oriented at an angle of about 45° with respect to the axis A1. Both portions 26, 28, the strap 24 and the hinge 34 are preferably made of a thermoplastic material such as Nylon 6/6 and are preferably injection molded as a single unit. The outer element 22 is highly stressed, and for this reason it is preferred to inject the thermoplastic material that forms the outer element 22 radially outwardly via a gate that extends over 360°, and then to force the material axially through the mold. Additives such as rubber or glass fibers may be mixed with the thermoplastic material to obtain the desired structural properties.

Figure 8:
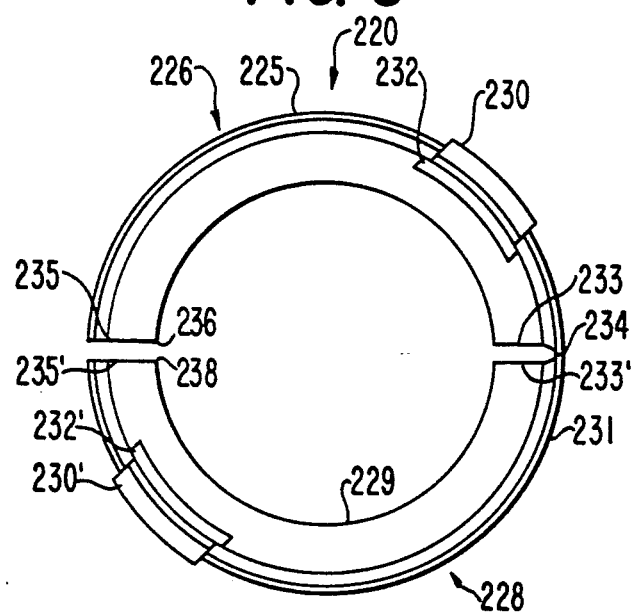
FIG. 8 is a cross-section of the inner element of an alternative embodiment of the locking member of this invention.

FIGS. 8 and 9 illustrate an alternative embodiment of the invention. In FIGS. 8 and 9 parts of the alternative embodiment which correspond to numbered parts of the embodiment of FIGS. 1-7 are numbered with a prefix of "200," followed by the numeral corresponding to the numeral used to identify the corresponding parts of the embodiment of FIGS. 1-7. For example, the living hinge 34 of FIG. 3 corresponds to the living hinge 234 of FIG. 8.

The primary difference between the embodiment of FIGS. 8 and 9 and the embodiment of FIGS. 1-7 is that the inner element 220 defines recesses 232, 232' beneath and in alignment with the ridges 230, 230'. These recesses are positioned to provide a space into which the ridges can move when compressed by the outer element 222 during assembly.

Figure 9A:
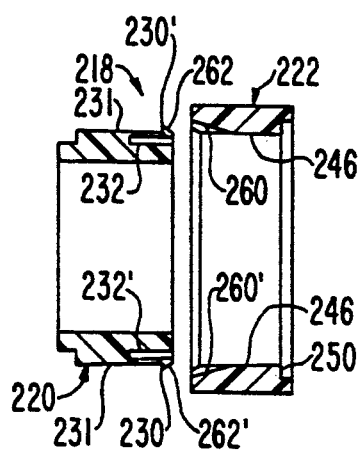
FIGS. 9A, 9B and 9C are illustrations of the assembly of the inner element of FIG. 8 with an outer element similar to that of FIG. 4.
Figure 9B:
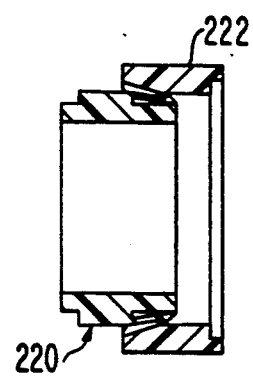
Figure 9C:
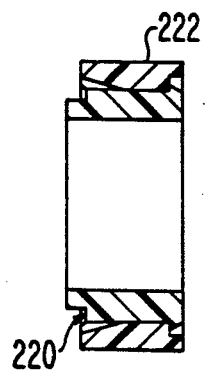

As shown in FIGS. 9A-9C, the inner element 220 is inserted into the outer element 22 in such a fashion that the ridges 230, 230' are elastically deformed inwardly. This deformation is facilitated by the openings 232, 232' which reduce stress on the ridges. Once the inner element 220 is fully inserted into the outer element 222 and the ridges protrude on the opposite side of the outer element, they are engaged by the outer element in the flange 250 (see FIG. 9C).

In another variation, the locking means for locking the inner element 20 within the outer element 22 may comprise a suitable adhesive between mating surfaces. A suitable adhesive is a micro-encapsulated epoxy such as that supplied by 3M Company. At the time of assembly, the capsules are broken, thereby activating the epoxy. Another approach to retaining the two elements together is to rely on the friction between the inner and the outer elements 20, 22. This friction may be increased by roughening the surfaces 25, 27, 29, 46 by sand-blasting the mold surfaces used to form these surfaces, as for example with an 60-1000 (preferably about 160) aluminum oxide grit. This enhances the frictional grip between the interior surface of the inner element and the stabilizer bar, as well as between the interior surface of the outer element and the external surface of the inner element.

The inner element can also be welded to the outer element for example by sonic welding to hold the assembled locking member together. The combination of any of these means can also be used. For example, the mechanical interlock illustrated in the embodiments of FIGS. 1-9 can be combined with toughened mating surfaces.

The embodiments described above provide a number of significant advantages. The strap 24 automatically aligns the inner element 20 with the outer element 22 for assembly. This is particularly important if the locking ridges 30, 30' are to cooperate with the ramps 23, 23'. The living hinge 34 also facilitates assembly of the locking member 18. In the event adhesive is used to secure the inner element 20 to the outer element 22, the strap 24 can be used to support the inner element as it is dipped in the adhesive, while the outer element 22 is held out of the adhesive.

The locking member functions reliably on bars that vary in diameter by ±0.25 mm. The inner and outer elements 20, 22 are dimensioned to grip a bar at the smaller end of the anticipated range of bar diameters. When the inner element is applied to a larger diameter bar a gap is formed between adjacent ends of the first and second portions 26, 28, and the outer element 22 expands to accommodate the increased diameter of the inner element 20.

It is intended that the foregoing detailed description be regarded as illustrative rather than limiting, and that it be understood that it is the following claims, including all equivalents, which are intended to define the scope of this invention.

We claim:

1. A locking member comprising:
   an inner element;
   an outer element comprising a unitary annular ring; and
   a strap interconnecting the inner and outer elements;
   the inner element comprising at least two portions joined to each other by at least one hinge at one end of each of the portions, each of said portions comprising a first tapered surface, tapered along an axis of the inner element;
   the outer element comprising a second tapered surface, tapered along an axis of the outer element;
   said second tapered surface positioned to contact the inner element, and said first and second tapered surfaces oriented to allow insertion of the inner element into the outer element.

2. The invention of claim 1 wherein one of said elements comprises means for locking the inner element in an assembled position within the outer element.

3. The invention of claim 2 wherein the inner element comprises the locking means.

4. The invention of claim 3 wherein the locking means comprises at least one locking ridge protruding from an external surface of one of the portions.

5. The invention of claim 3 wherein the locking means comprises at least two locking ridges, each protruding from an external surface of a respective one of the portions.

6. The invention of claim 5 wherein each of the portions defines an opening, and wherein each opening is positioned substantially beneath and in alignment with the respective locking ridge.

7. The invention of claim 1 wherein the second tapered surface defines an angle of about 1 degree to about 5 degrees with respect to the axis of the outer element.

8. The invention of claim 1 wherein the second tapered surface defines an interior surface of the outer element.

9. The invention of claim 8 wherein the first tapered surface defines an external surface of each of said two portions.

10. The invention of claim 1 wherein the two portions comprise a first portion and a second portion, wherein ends of the first and second portions opposed to the hinge are shaped to create a gap therebetween when the inner element is placed around a stabilizer bar.

11. The invention of claim 1 wherein the outer element defines a substantially circular shape, and wherein the first and second portions of the inner element define a substantially circular shape when the inner element is inserted within the outer element.

12. The invention of claim 11 wherein the axis of the inner element is substantially concentric with the axis of the outer element when the inner element is inserted within the outer element.

13. The invention of claim 2 wherein the locking means comprises at least one friction enhancing surface on one of the inner and outer elements in contact with a surface on the other of the inner and outer elements.

14. The invention of claim 2 wherein the locking means comprises an adhesive placed between the inner and outer elements.

15. The invention of claim 14 wherein the adhesive comprises a micro-encapsulated epoxy.

16. The invention of claim 2 wherein the locking means comprises a welded joint between the inner and outer elements.

17. A locking member comprising:
    an inner element comprising at least two portions, each comprising a first tapered surface, tapered along an axis of the inner element;
    an outer element comprising a unitary annular ring, said ring comprising a second tapered surface, tapered along an axis of the outer element and positioned to contact the inner element;
    at least one locking ridge positioned on one of the inner and outer elements;
    at least one ramp formed on the other of the inner and outer elements to receive the locking ridge;
    said first tapered surface extending over a first length along the first axis, said ramp extending over a second length along the first axis, and said first length being greater than said second length;
    said first and second tapered surfaces oriented to allow insertion of the inner element into the outer element.

18. A stabilizer bar assembly comprising an automobile stabilizer bar and a two element locking member comprising an inner element and an outer element, the inner element comprising at least two portions, each of said two portions comprising an interior surface in contact with the stabilizer bar and an external surface, wherein one of said surfaces of each of said two portions defines a first tapered surface which is tapered along an axis of the inner element, the outer element comprising an interior surface in contact with the inner element and an external surface, wherein the interior surface of the outer element defines a second tapered surface which is tapered along an axis of the outer element, said first and second tapered surfaces cooperating to generate an inwardly directed clamping force which clamps the inner element in position on the stabilizer bar.

19. The invention of claim 18 wherein said two portions are joined to each other by at least one hinge at one end of each of said two portions.

20. The invention of claim 19 wherein the hinge is oriented parallel to the axis of the inner element.

21. The invention of claim 18 wherein the locking member comprises at least one locking ridge protruding from one of the inner and outer elements to lock the inner and outer elements together in an assembled relationship.

22. The invention of claim 18 wherein the inner element comprises at least one locking ridge protruding from the external surface of the first portion and at least one locking ridge protruding from the external surface of the second portion, said locking ridges shaped to lock the inner and outer elements together in an assembled relationship.

23. The invention of claim 19 wherein said two portions comprise a first portion and a second portion, wherein the ends of the first and second portions opposed to the hinge are shaped to create a gap therebetween.

24. The invention of claim 18 wherein the outer element defines a substantially circular shape, and wherein the first and second portions define a substantially circular shape when the inner element is inserted within the outer element.

25. The invention of claim 18 wherein the locking member further comprises a strap interconnecting the inner element and the outer element such that the portions of the inner element and the outer element form a unitary construction.

26. A locking member comprising:
an inner element;
an outer element; and
a strap interconnecting the inner and outer elements;
the inner element comprising at least two portions joined to each other by at least one hinge at one end of each of the portions, each of said portions comprising a first tapered surface, tapered along an axis of the inner element;
the outer element comprising a second tapered surface, tapered along an axis of the outer element;
said second tapered surface positioned to contact the inner element, and said first and second tapered surfaces oriented to allow insertion of the inner element into the outer element;
wherein the strap has a length, wherein the inner element has a length along the axis, and wherein the length of the strap is greater than the length of the inner element.

27. The invention of claim 26 wherein the strap is operative to align the inner element automatically with the outer element for insertion of the inner element into the outer element.

* * * * *

UNITED STATES PATENT AND TRADEMARK OFFICE
CERTIFICATE OF CORRECTION

PATENT NO. : 5,145,273
DATED : September 8, 1992
INVENTOR(S) : Keith Hellon et al.

It is certified that error appears in the above-identified patent and that said Letters Patent is hereby corrected as shown below:

On title page, Item [56]:
IN THE REFERENCES CITED

In column 1 of the title page under the heading "U.S. PATENT DOCUMENTS", please delete "Cosken" and substitute therefor --Coskun--.

In column 4, line 27, please delete "22" and substitute therefor --222--.

In column 4, line 58, please delete "toughened" and substitute therefor --roughened--.

Signed and Sealed this

First Day of March, 1994

BRUCE LEHMAN

*Attest:*

*Attesting Officer*     *Commissioner of Patents and Trademarks*